United States Patent
Smullin (10) Patent No.: US 7,361,282 B2
(45) Date of Patent: Apr. 22, 2008

(54) SEPARATOR OF FLOATING COMPONENTS

(75) Inventor: Joseph I. Smullin, Swampscott, MA (US)

(73) Assignee: Smullin Corporation, Marblehead, MA (US)

( * ) Notice: Subject to any disclaimer, the term of this patent is extended or adjusted under 35 U.S.C. 154(b) by 594 days.

(21) Appl. No.: 10/623,667

(22) Filed: Jul. 21, 2003

(65) Prior Publication Data
US 2005/0016937 A1  Jan. 27, 2005

(51) Int. Cl.
C02F 1/24 (2006.01)
B01D 47/02 (2006.01)
B63H 21/23 (2006.01)
F01N 7/12 (2006.01)

(52) U.S. Cl. .................... 210/703; 210/712; 440/89 R; 440/89 B; 440/89 F; 95/189; 95/195; 95/206

(58) Field of Classification Search ................. 210/703, 210/712; 440/89 R, 89 B, 89 F; 95/206, 95/195, 189

See application file for complete search history.

(56) References Cited

U.S. PATENT DOCUMENTS

| 784,833 | A | 3/1905 | Brush |
|---|---|---|---|
| 1,015,955 | A | 1/1912 | Helder |
| 1,065,707 | A | 6/1913 | Montgomery |
| 1,076,571 | A | 10/1913 | Hall, Jr. |
| 1,127,807 | A | 2/1915 | Perkins |
| 1,759,679 | A | 5/1930 | Beckman |
| 1,816,371 | A | 7/1931 | Hefti |
| 1,938,849 | A | 12/1933 | Maxim et al. |
| 2,360,429 | A | 10/1944 | Leadbetter |
| 2,498,979 | A | 2/1950 | Bourne |
| 2,713,026 | A * | 7/1955 | Kelly et al. ................. 210/207 |
| 2,961,059 | A | 11/1960 | Blair |
| 3,291,252 | A | 12/1966 | Davis |
| 3,296,997 | A | 1/1967 | Hoiby et al. |
| 3,431,882 | A | 3/1969 | Irgens |
| 3,446,353 | A * | 5/1969 | Davis ........................ 209/164 |
| 3,505,188 | A * | 4/1970 | Pan ........................... 205/757 |

(Continued)

FOREIGN PATENT DOCUMENTS

AU           741927          3/2002

(Continued)

OTHER PUBLICATIONS

Boating Industry Magazine, Jul. 1997 at 61.

(Continued)

Primary Examiner—Thomas M. Lithgow
(74) Attorney, Agent, or Firm—Wolf, Greenfield & Sacks, P.C.

(57) ABSTRACT

A buoyant component separator is disclosed for removing at least some floating contaminants from fluids. The component separator may be used with a marine engine exhaust system to reduce particulate matter and unburned fuel contained in liquid coolant before it is jettisoned overboard and pollutes the surrounding body of water. In one embodiment, the separator includes a first part for receiving a mixture of liquid and buoyant components and a second part joined by a communication passage, where the liquid flows through the communication passage to the second part and the buoyant components substantially accumulate in the first part. A method of separating a liquid from buoyant components is also provided.

21 Claims, 6 Drawing Sheets

U.S. PATENT DOCUMENTS

| | | | |
|---|---|---|---|
| 3,642,617 A * | 2/1972 | Brink et al. ................. 210/704 |
| 4,019,456 A | 4/1977 | Harbert |
| 4,156,648 A * | 5/1979 | Kuepper ..................... 210/752 |
| 4,184,566 A | 1/1980 | Baker et al. |
| 4,184,954 A * | 1/1980 | Peterson ..................... 210/791 |
| 4,310,067 A | 1/1982 | Thomson |
| 4,315,559 A | 2/1982 | Casey |
| 4,396,508 A | 8/1983 | Broughton |
| 4,416,350 A | 11/1983 | Hayashi |
| 4,490,248 A * | 12/1984 | Filippov et al. ............. 209/164 |
| 4,551,246 A * | 11/1985 | Coffing .................... 210/221.2 |
| 4,554,074 A | 11/1985 | Broughton |
| 4,601,666 A | 7/1986 | Wood, Jr. |
| 4,678,442 A | 7/1987 | Nishida et al. |
| 4,713,029 A | 12/1987 | Ford |
| 4,917,640 A | 4/1990 | Miles, Jr. |
| 5,022,877 A | 6/1991 | Harbert |
| 5,041,036 A | 8/1991 | Clark et al. |
| 5,045,005 A | 9/1991 | Miles, Jr. |
| 5,147,232 A | 9/1992 | Miles, Jr. et al. |
| 5,196,655 A | 3/1993 | Woods |
| 5,259,797 A | 11/1993 | Miles, Jr. et al. |
| 5,550,337 A | 8/1996 | Tazaki et al. |
| 5,554,058 A | 9/1996 | LeQuire |
| 5,588,888 A | 12/1996 | Magharious |
| 5,594,217 A | 1/1997 | LeQuire |
| 5,625,173 A | 4/1997 | Woods |
| 5,746,630 A | 5/1998 | Ford et al. |
| 5,788,410 A | 8/1998 | Stucks |
| 5,980,344 A | 11/1999 | Widmann |
| 6,024,617 A | 2/2000 | Smullin et al. |
| 6,045,422 A | 4/2000 | Widmann |
| 6,200,179 B1 * | 3/2001 | Widmann et al. ......... 440/89 R |
| 6,203,698 B1 | 3/2001 | Goodrich |
| 6,226,984 B1 | 5/2001 | Ford |
| 6,273,772 B1 | 8/2001 | Smullin |
| 6,591,939 B2 | 7/2003 | Smullin et al. |

FOREIGN PATENT DOCUMENTS

| | | | |
|---|---|---|---|
| CH | 208713 | | 2/1940 |
| DE | 3521036 | * | 12/1985 |
| DE | 4302358 | * | 6/1993 |
| FR | 1.333.900 | | 8/1963 |
| FR | 1545976 | * | 11/1968 |
| FR | 2591128 | * | 6/1987 |
| GB | 124551 | | 3/1919 |
| GB | 344735 | | 3/1931 |
| GB | 2035285 | * | 6/1980 |
| SU | 715143 | * | 2/1978 |
| SU | 1191863 | * | 3/1980 |

OTHER PUBLICATIONS

Centek Industries, Inc., Product Information Catalog (1997).
Perry et al., "Phase Separation," Chemical Engineers' Handbook, Fourth Edition, Copyright © 1963 by McGraw-Hill, Inc., pp. 18-82 to 8-86.
Soundown Waterdrop™ Silencer Product Information, no date.
Translation of DE 4302358, previously cited by the Examiner, Jun. 9, 1993.
International search report and written opinion, Nov. 2, 2004.

* cited by examiner

SEPARATOR OF FLOATING COMPONENTS

FIELD OF INVENTION

The present invention generally relates to devices and methods for removing floating components from fluids. More particularly, the invention relates to reducing slicks of soot and unburned fuel from the emissions of water injected marine engine exhaust systems.

BACKGROUND OF INVENTION

Marine engine exhaust systems typically inject liquid coolant into engine exhaust gas to cool the exhaust gas from the engine by forming a fluid mixture of the liquid coolant and exhaust gas. This method may also result in noise reduction and reduced pollutants in the expelled exhaust gas. The liquid coolant is typically water taken from the body of water in which the marine vessel is floating. The pollutants, such as particulate matter and unburned fuel, exit with the exhaust gas when it leaves the engine. Once the liquid coolant and exhaust gas are mixed, the resulting fluid mixture includes these pollutants. In certain exhaust systems, the fluid mixture is thereafter substantially separated into its liquid coolant and exhaust gas components. The exhaust gas and fluid may thereafter be expelled through separate conduits, after the gas/fluid separation process. This process extracts significant particulate matter and unburned fuel, such as oil, from the exhaust gas, resulting in a cleaner exhaust gas when it is released from the exhaust system. However, the particulate matter and unburned fuel remain largely in the liquid coolant and are usually discharged with the liquid coolant into the body of water in which the vessel is located. Thus, the benefit to the ecology of removing pollutants from the exhaust gas is offset by the negative ecological impact of pollutants being added to the discharged liquid coolant. For example, when the liquid coolant is jettisoned overboard, a slick of particulate matter or soot and unburned fuel may float on the surface of the water. The particulate matter eventually saturates and sinks, while the unburned fuel floats on the surface until it evaporates or until it is absorbed on the shore, such as in birds' feathers or other coalescing surfaces.

Methods for cleansing the liquid coolant to be discharged from marine engine exhaust systems include various soot sinker designs, which have the purpose of accumulating and storing floating particulate matter until it becomes water saturated. Thereafter, the sunken particulate matter is expelled from the exhaust system into the surrounding water to sink, away from visible pollution on the surface of the water. Other devices use fibrous filters and pressure pumps to remove the particulate matter and unburned fuel from the liquid coolant. In order to keep the filters functioning properly, they may need to be frequently cleaned or replaced.

SUMMARY OF INVENTION

The goal of reducing pollution from marine engines may be achieved by reducing buoyant components, such as pollutants including particulate matter and unburned fuel, in the liquid coolant before the liquid coolant is jettisoned overboard. This allows liquid coolant to still be used to cool the exhaust gas, and thereby still reduce pollutants in the exhaust gas being expelled, while removing at least some of the pollutants from the liquid coolant and reducing overall pollution caused by the marine engine exhaust system.

According to one embodiment of the invention, a method of separating a liquid from buoyant components presented in a mixture thereof is disclosed. The method comprises the steps of: providing a separator chamber and a member divided into a first part and a second part and defining a communication passage for liquid flow from the first part into the second part, introducing the mixture into the first part of the separator chamber, and flowing the liquid from the first part through the communication passage into the second part of the separator chamber while substantially accumulating the buoyant components in the first part.

According to yet another embodiment of the invention, a component separator is disclosed. The component separator includes a first chamber constructed and arranged to receive a mixture including a liquid and buoyant components. A second chamber is fluidly coupled to the first chamber. A communication passage is constructed and arranged to provide the fluid communication between the first and second chambers. The liquid flows through the communication passage from the first chamber into the second chamber while the buoyant components substantially accumulate in the first chamber.

In yet another embodiment of the invention, a component separator is disclosed. The component separator includes a separator chamber constructed and arranged to receive a mixture including a liquid and buoyant components. A wall is constructed and arranged to separate the separator chamber into a first part adapted to receive the mixture and a second part. A communication passage is adapted to provide fluid communication between the first part and second part of the separator chamber. The liquid in the first part flows through the communication passage from the first part into the second part of the separator chamber while the buoyant components substantially accumulate in the first part.

BRIEF DESCRIPTION OF DRAWINGS

The objects, advantages and features of aspects of the invention will be more clearly appreciated from the following detailed description, when taken in conjunction with the accompanying drawings, wherein like numbers are used for like features, in which.

DETAILED DESCRIPTION

The invention is directed to a device and method for removing at least some buoyant components from liquid. Although the device and method illustrated and described are for use with a marine engine exhaust system, it is to be appreciated that the component separator may be used in a variety of different applications where liquid may include buoyant or floating components that are desired to be separated from the liquid. Thus, the illustrated and described component separator is not intended for use only with marine engine exhaust systems. As used herein the term "buoyant components" is intended to include any and all buoyant or floating components including, without limitation, pollutants, particulate matter such as soot, and unburned fuel such as oil.

The component separator may be used to reduce floating slicks of soot and unburned fuel, which are a common result of liquid-injected exhaust systems of marine engines, as described above. Marine engines may use liquid-injected exhaust systems for cooling, noise reduction and reducing pollutants in the exhaust gas expelled from the exhaust system. Generally, the component separator of the invention includes a chamber into which is introduced a liquid mixture including liquid and buoyant components, and small amounts of the exhaust gas. The buoyant components of the liquid mixture are less dense and float on or near the surface of the liquid. The more dense liquid may be removed through an outlet in the lower portion of the chamber away from the free surface of the fluid mixture.

In one embodiment, the chamber may be divided into first and second parts by a wall. The wall may define a communication passage. For example, the wall may have a bottom edge defining a gap between the bottom edge and the bottom of the first part of the chamber, such that there is fluid communication between the parts of the chamber. The communication passage may also be formed by a filtering medium, openings or tubing between the first and second parts. In this embodiment, the first and second parts may be substantially side-by-side. In another embodiment, although they may still be side-by-side, the first part may be provided at least partially above the second part, with the communication passage being formed by a filtering medium or other openings or tubing between the first and second parts. The liquid mixture may be introduced into the first part of the chamber allowing the liquid and the buoyant components to substantially separate. The liquid may flow from adjacent the bottom of the first part through the communication passage into the second part of the chamber and the buoyant components may accumulate in the first part of the chamber.

In another embodiment, a receiving chamber may be provided to initially receive the liquid mixture. The buoyant components, along with a portion of the liquid, may be transported into the first part of the separator chamber. The buoyant components may rise to the top of the liquid mixture substantially separating into buoyant components and liquid. The liquid will flow substantially free of buoyant components into the second part of the separator chamber. In another embodiment, the liquid mixture may include some exhaust gas when it enters the receiving chamber. The buoyant force of the gas bubbles will lift the liquid mixture or bubbly slurry to a height above the liquid level in the receiving chamber. The exhaust gas, in the form of entrapped gas bubbles, will rise to the surface along with the buoyant components and move into the separator chamber. The separated liquid may be drained from either the second part of the separator chamber or the receiving chamber.

Figure 1:
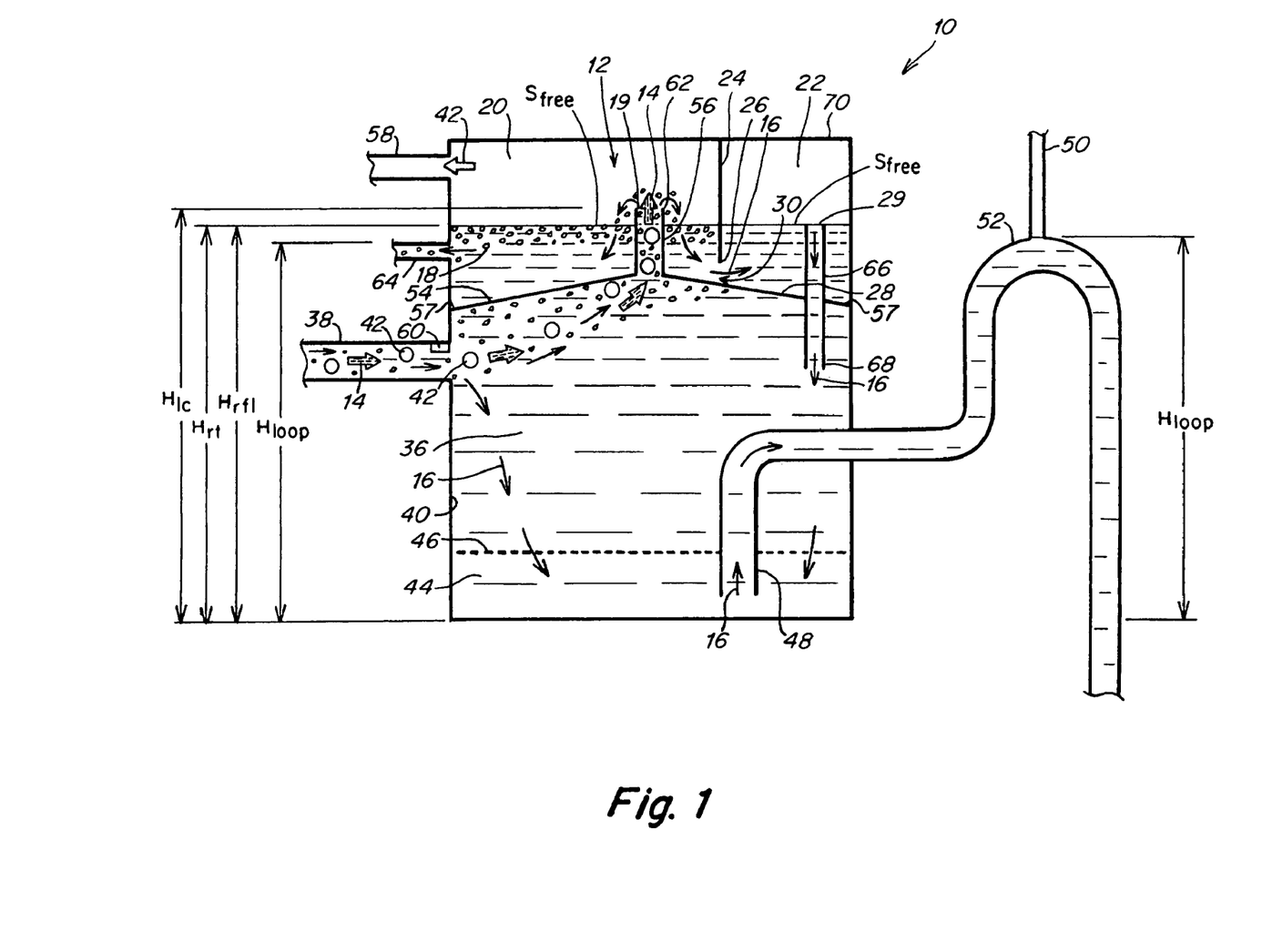
FIG. 1 is a schematic view of a buoyant component separator according to the invention.

One illustrative embodiment of a component separator 10 according to the teaching of the present invention is shown in FIG. 1. The component separator 10 has at least one separator chamber 12. The separator chamber 12 receives the liquid mixture 14, including liquid 16 and buoyant components 18 through inlet 19. As illustrated, the separator chamber 12 is separated into a first part 20 and a second part 22 by a dam or wall 24. The liquid mixture 14 is delivered into the first part 20 of the separator chamber 12. The wall 24 has a bottom edge 26 spaced from a bottom surface 28 of the separator chamber 12 so that a communication passage is formed by a gap 30 between the bottom surface 28 of the separator chamber 12 and the wall 24. This opening or gap 30 provides fluid communication between the first part 20 and second part 22 of the separator chamber 12. As the liquid mixture 14 is delivered into the first part 20 of the separator chamber 12, the buoyant components 18 rise at least adjacent to a free surface $S_{free}$ of the liquid mixture 14, while the more dense liquid 16 settles below the buoyant components 18. The liquid 16, substantially free of the buoyant components 18, flows into the second part 22 of the separator chamber 12 through gap 30. The separated liquid 16 may then exit the component separator 12, for example from an outlet 29 in the second part 22 of the separator chamber 12.

It is to be appreciated that the wall 24 and gap 30 may have numerous different configurations. Any suitable communication passage may be provided between two separate chambers or parts of a chamber including, but not limited to, tubing, openings, gaps, perforated screens and filtering mediums. For example, any gap or opening to allow the liquid 16 to flow from the first part 20 to the second part 22 is sufficient. The gap or opening may be near or adjacent the bottom surface 28 of the separation chamber 12. More than one opening, gap or passage may be provided and these may be any suitable shape or size. It will be appreciated that the communication passage may be selectively openable and closable by any suitable means, including either electrical or mechanical devices.

Figure 3:
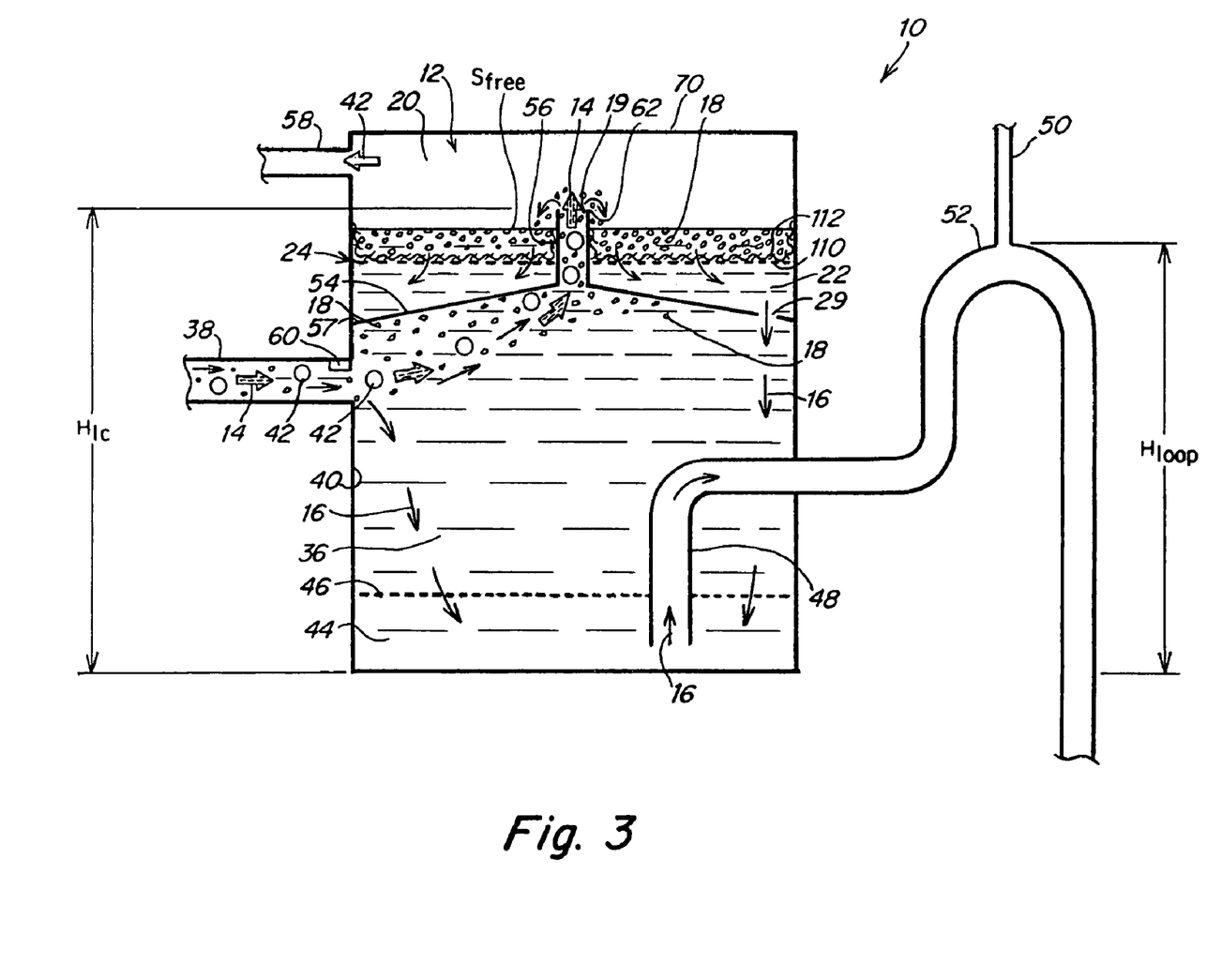
FIG. 3 is a schematic view of another embodiment of a buoyant component separator according to the invention.

Another illustrative embodiment of the component separator 10 according to the teaching of the present invention is shown in FIG. 3. The component separator 10 has at least one separator chamber 12. Similar to the embodiment of FIG. 1, the separator chamber 12 receives the liquid mixture 14, including liquid 16 and buoyant components 18 through inlet 19. As illustrated, the wall 24 which previously was shown as a solid dam, has been re-embodied as a porous support 110 and/or filter medium 112, which separate the separator chamber 12 into the first part 20 and the second part 22. The liquid mixture 14 is delivered into the first part 20 of the separator chamber 12. A communication passage is formed by the filter medium 112 and porous support 110, which separate the first part 20 and the second part 22 of the separator chamber 12. The porous support 110 and filter medium 112 provide fluid communication between the first part 20 and second part 22 of the separator chamber 12. As the liquid mixture 14 is delivered into the first part 20 of the separator chamber 12, the buoyant components 18 are trapped by the filter medium 112 and porous support 110, while the liquid 16, substantially free of buoyant components, flows through them into the second part 22 of the chamber 12. If enough liquid mixture 14 enters the separator chamber, a free surface $S_{free}$ of the liquid mixture 14 may form above the filter medium 112, such that the buoyant components 18 may rise at least adjacent the free surface of the liquid mixture 14, while the more dense liquid 16 settles below the buoyant components 18. The separated liquid 16 may then flow through the wall and exit the component separator 12, for example from an outlet 29 in the second part 22 of the separator chamber 12.

The porous support 110 and/or filter medium 112 can be employed as an alternative to a solid dam or wall 24 or in augmentation thereof.

The filter medium 112 may be formed as a filter cup that is attached to the lift conduit 56 and the outer walls of the chamber 12 by any suitable manner. Alternatively, the filter medium 112 may rest on the porous support 110. The filter medium 112 may be made of any suitable material, including porous, fibrous, filter or other material such that the buoyant components 18 will be caught and substantially prevented from flowing through the filter medium. The filter medium 112 may be accessible for cleaning or disposal periodically and may be permanently installed or removable.

The porous support 110 may be any suitable device provided below the filter medium to add support. For example, the porous support 110 may prevent tearing, ripping or breakage of the filter medium 112 from the weight of the accumulated buoyant components 18. The porous support 110 may be permanently or removably installed between the first and second parts of the chamber. It will be appreciated that the porous support may be made of any suitable material and in any configuration that allows the liquid to flow through from the filter medium so that liquid does not substantially collect between the porous support and filter medium. For example, the porous support may be a metal or plastic sheet with perforations or holes and at least part of the porous support may include these perforations or holes or a screen of metallic or plastic threads. It will also be appreciated that either of the porous support 110 or the filter medium 112 may be used alone to accumulate the buoyant components 18 in the first part of the chamber.

As illustrated in FIGS. 1 and 3, the component separator 10 may additionally include a receiving chamber 36 fluidly coupled with the separator chamber 12. The receiving chamber 36 may receive the liquid mixture 14 through an inlet 38 in a wall 40 of the receiving chamber 36. In addition to liquid 16 and buoyant components 18, the liquid mixture 14 may also include small quantities of entrapped exhaust gas 42. After introduction into the receiving chamber 36, the buoyant components 18 may rise to the top of the receiving chamber 36, along with the entrapped exhaust gas 42, in the form of bubbles or froth.

In the lower portion 44 of the receiving chamber 36, one or more perforated layers 46 may be provided. The perforated layers 46 interfere with potential high velocity flows and vortexes that may occur at the inlet 38 of the receiving chamber 36 potentially carrying the buoyant components 18 downward, thus interfering with their separation from the liquid 16. The perforated layers 46 may be any suitable device to reduce the velocity of the flow of the liquid mixture 14 in the receiving chamber 36. For example, the perforated layers 46 may be filters, pads, screens, fibrous or porous layers or any kind of structure that will allow liquid 16 to flow through it yet reduce the velocity of the flow, such that high-velocity flows are dissipated. The perforated layer 46 may include one or more layers and may be installed permanently in the receiving chamber 36, or alternatively, may be removable. For example, the perforated layer 46 may be held in place by grooves in the walls of the receiving chamber 36 such that it may be removed for cleaning when desired. The perforated layer 46 may, in addition to interrupting high velocity flows and vortexes, filter out buoyant or other components from the liquid 16.

A discharge conduit 48 may be provided in the receiving chamber 36, through which the liquid 16, substantially free of buoyant components 18, is discharged. The discharge conduit 48 may be located in any suitable location; however, being provided below the perforated layer 46 allows additional separation to occur such that the discharge conduit 48 drains the liquid 16, substantially free of buoyant components 18. It is to be appreciated that the discharge conduit 48 may be any suitable conduit (such as, but not limited to tubing) and may be either rigid or flexible or a combination of both. To improve flow, the discharge conduit 48 may feature a vent 50 and/or a loop 52 to regulate the liquid surface level in the receiving chamber 36. The loop may have a height $H_{loop}$.

The receiving chamber may include a top plate 54. The top plate 54 may be substantially flat; however, as illustrated, the top plate 54 has a funnel or concave shape. The top plate 54 may slant upward from the walls 40 of the receiving chamber 36 toward a lift conduit 56 fluidly connecting the receiving chamber 36 to the separator chamber 12. As shown, the top plate 54 is sealed at its edges 57 to the walls of the receiving chamber 36 so that buoyant components 18 may not flow from the separation chamber 12 into the receiving chamber 36 along the edges 57 of the top plate 54. The lift conduit 56 is illustrated as provided near the highest point of the top plate 54; however, the lift conduit 56 may be provided at any suitable location in the first part 20 of the separator chamber 12.

Buoyancy forces may direct the buoyant components 18 and gases toward the lift conduit 56, and the buoyancy of the gases and pressure may force gas bubbles 42 upward through the lift conduit 56, particularly due to the upward slant of top plate 54. Buoyant components 18 may be carried as a froth along with the bubbles 42, through the lift conduit 56 and inlet 19 into the separator chamber 12. Once in the separator chamber 12, the gases may be vented from the separator chamber 12 by a gas vent 58. It will be appreciated that when entrapped gas 42 is not present to propel the flow through the lift conduit 56, other suitable pumping mechanisms may be employed. It will be appreciated that excess exhaust gas 42, such as from the exhaust manifold or small pump, may be introduced into the liquid mixture 14 to augment the gas bubbles 42 that direct the buoyant components up through the lift conduit 56. Additionally, the funnel or convex shape of the top plate 54 may assist in directing the buoyant components 18 and gases 42 to the lift conduit 56.

The inlet 38 of the receiving chamber 36 may feature a flow adjuster 60 to modify the flow of the liquid mixture 14 before and/or after it enters the receiving chamber 36. In one embodiment, the flow adjuster 60 may include a flow deflector, intended to dissipate flow momentum entering the receiving chamber 36, so that buoyancy forces have greater opportunity to separate buoyant components 18 from the liquid 16. In another embodiment, the flow adjuster 60 may include having the inlet 38 to the receiving chamber 36 disposed in such a manner as to impart a circular rotation to the liquid mixture 14 in the receiving chamber 36, adding a centrifugal force component, which forces buoyant components 18 toward the center of the receiving chamber 36, where they will rise through the lift conduit 56 to the separator chamber 12. Additionally, the flow adjuster 60 may include a diffuser at or near the inlet 38 to slow the velocity of the flow of the liquid mixture 14 into the receiving chamber 36.

It is to be appreciated that the separator chamber 12 and the receiving chamber 36 may be any suitable size and shape. The suitable size may be determined by the volume of liquid mixture 14 being received by the component separator 10. The chambers 12 and 36 may be any suitable shape, such as a rectangular or substantially cylindrical shape. The chambers 12 and 36 may also include interior surfaces to direct flow in the chambers, such as by providing a circular rotation to the flow and adding a centrifugal force component, which may assist in directing gas bubbles 42 and buoyant components 18 to the center of the receiving chamber 36, where they will rise upward through the lift conduit 56. It is also to be appreciated that the separator chamber 12 and the receiving chamber 36 may be within a single housing which is divided into two separate sections. Additionally, it is to be appreciated that the first part 20 and second part 22 of the separator chamber 12, as described above, may be two separate chambers connected to one another. The chambers and tubing of the component separator may be made of any suitable material such as metals or plastics. If the component separator is for use with a marine engine and the fluid mixture includes sea water, then the material preferably will be selected to be resistant to the corrosive effect of sea water.

As described above and shown in FIG. 1, the separator chamber 12 is divided into the first part 20, generally the dirty side, and the second part 22, generally the cleaner side. The lift conduit 56 expels gas 42 and liquid mixture 14 into the dirty side, from a top end 62 which is provided at a height $H_{lc}$, slightly above the regulated fluid level $H_{rfl}$ in the separator chamber 12 regulated by the height of return tube 66 in the second part 22 which is provided below the height of the lift conduit. The liquid mixture 14 enters and the buoyant components 18 rise to the free surface $S_{free}$ while the more dense liquid 16 sinks.

In addition to the gas vent 58, the first part of the chamber may include a dirty liquid drain outlet 64 for draining liquid and buoyant components from the first part of the separator chamber 12 together. The drain outlet 64 is shown provided at a height near the maximum height of the liquid (but need not be at that height) such that both liquid 16 and buoyant components 18 may exit through this drain outlet 64 together. The drain outlet 64 may be selectively opened and closed, such as by use of a valve to remove buoyant components such as pollutants that have accumulated in the first part of the chamber. A sensor or control system may be used to selectively open and close the drain outlet 64.

As discussed above, the wall 24 separating the first and second parts 20 and 22 of the separator chamber 12 has a communication passage that allows flow between the two parts only at the lower portion of the first part 20, away from the buoyant components 18. The wall 24 may be permanently installed in or removable from the separator chamber 12. For example, the wall 24 may be connected to the walls of the separator chamber 12 such that the top 70 of the separator chamber 12 may be removed without removing the wall 24.

Figure 2:
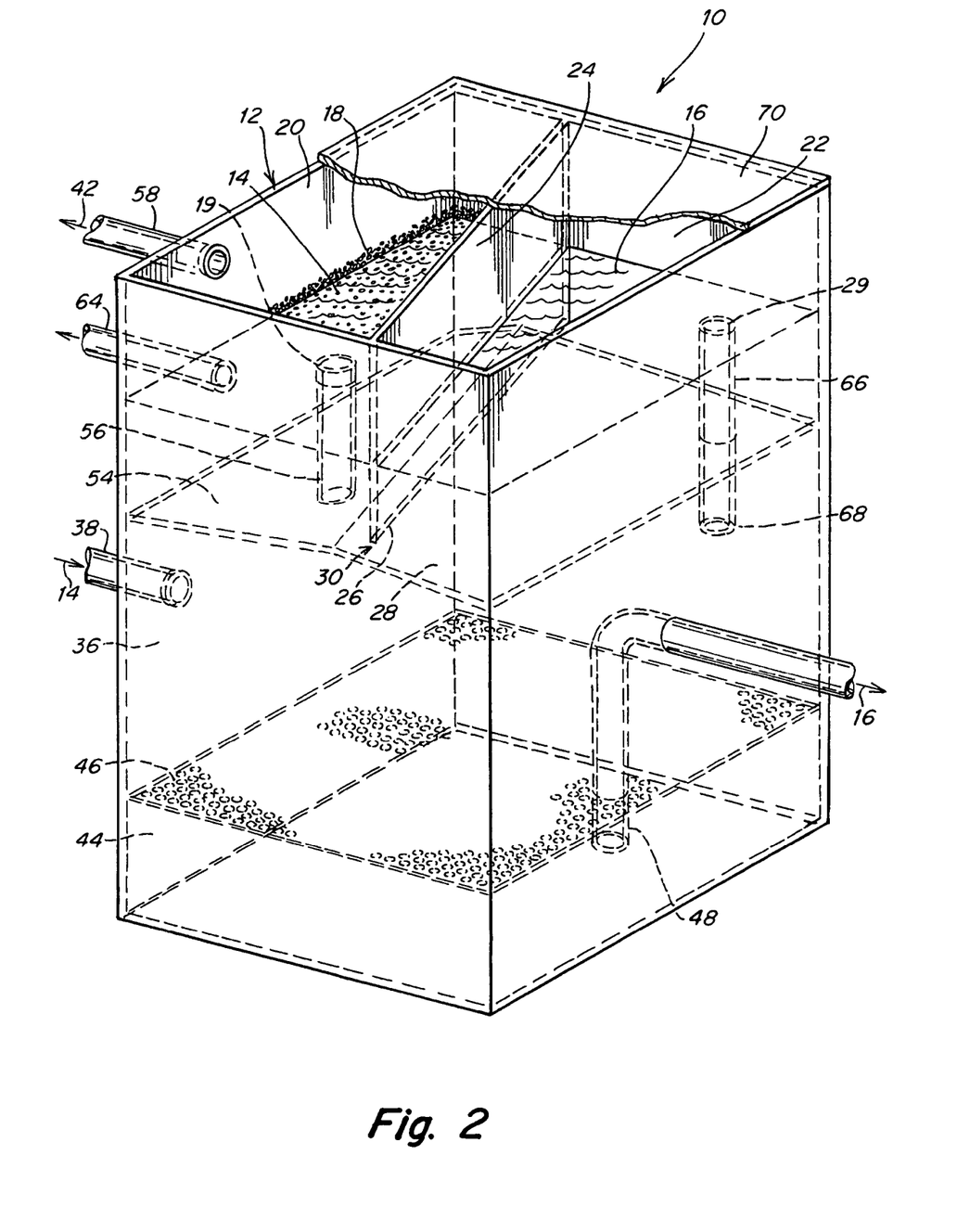
FIG. 2 is a perspective top view of the buoyant component separator of FIG. 1 according to the invention.

Referring now to FIG. 2, a perspective top view of the separator chamber 12 of FIG. 1 is shown. The wall 24 is shown dividing the first and second parts 20 and 22 of the separator chamber 12. The buoyant components 18 are floating on the surface of the fluid mixture 14 in the first part 20 of the separator chamber 12. The liquid 16 in the second part 22 is substantially free of buoyant components 18. The height of the liquid shown in FIG. 2 is lower than it may be during normal operation of the component separator 10. For example, the liquid 16 may rise to the level of the buoyant components 18 on the walls of the first part 20 of the separator chamber 12.

At least a portion of the trapped buoyant components 18 may be removed from the first part 20 of the separator chamber 12. This may be done by draining through the dirty liquid drain outlet 64, or by scooping components from the separator chamber 12, for example after removing the top 70 of the separator chamber 12. Alternatively, the buoyant components 18 may be absorbed in specially designed surface absorption pads, or by use of filter papers stretched across the chamber, below the level of the height $H_{lc}$ of the lift conduit 56. If the dirty side is left alone, the components 18 will eventually become fully saturated and non-buoyant and will be contained in the bottom of the first part 20 of the separator chamber 12 until it is drained or otherwise cleaned. After removal of the buoyant components, they may be discarded.

The regulated fluid level $H_{rfl}$ of the liquid mixture 14 in the separator chamber 12 is controlled by the return tube 66 in the second part 22 of the separator chamber 12. The return tube 66 extends to a height $H_{rt}$ that acts as the liquid level control for the separator chamber 12. The height $H_{rt}$ of the return tube 66 is less than the height $H_{lc}$ of the lift conduit 56 in the first part 20 of the separator chamber 12. The return tube 66 has a discharge end 68 in the receiving chamber 36, such that when the fluid level rises above the return tube 66, the excess liquid flows from the second part 22 down the return tube 66 back into the receiving chamber 36. Because the height $H_{lc}$ of the lift conduit 56 is above the return conduit 66, the liquid does not typically flow back down the lift conduit 56, as the return tube 66 lowers the level of the liquid mixture 14 in the separator chamber 12 before that would occur. It is also to be appreciated that the height of the loop $H_{loop}$ in the discharge conduit 48 is provided below the height of the regulated fluid level $H_{rfl}$ or the return tube 66 would back-up. The return tube 66 may return the liquid mixture to the receiving chamber for additional recirculation through the component separator 10. For example, recirculating the liquid mixture may allow additional buoyant components to be removed.

As described above and shown in the embodiment of FIG. 3, the separator chamber 12 is also divided into the first part 20, generally the dirty side, and the second part 22, generally the cleaner side. The lift conduit 56 expels gas 42 and liquid mixture 14 into the dirty side, from a top end 62 which is provided at a height $H_{lc}$ and is above the filter medium 112 and porous support 110 which separate the first part 20 from the second part 22 of the separator chamber 12. The liquid mixture 14 enters and the buoyant components 18 are collected in the first part 20 of the chamber, while the liquid 16 flows through the filter medium 112 and the porous support 110 into the second part 22. The liquid 16, substantially free of buoyant and otherwise filtered components 18, may then drain through outlet 29 into the receiving chamber 36. If enough liquid mixture enters the chamber without a comparable amount draining from the outlet 29, a free surface $S_{free}$ may form above the filter medium 112 and porous support 110 such that the buoyant components 18 rise to the free surface, while the more dense liquid 16 sinks and drains from the outlet 29. The outlet 29 may keep the separator chamber from over filling and the liquid mixture from flowing back down the lift conduit 56.

As discussed above, the wall 24 separating the first and second parts 20 and 22 of the separator chamber 12 of FIG. 3 includes a communication passage that allows flow between the two parts at the lower portion of the first part of the separator chamber 12. The wall 24, including the filter medium 112 and porous support 110, may be permanently installed in or removable from the separator chamber 12 and the top 70 of the separator chamber 12 may be removed. The wall 24 is shown dividing the first and second parts 20 and 22 of the separator chamber 12 such that the first part 20 is above the second part 22.

At least a portion of the trapped buoyant components 18 may be removed from the first part 20 of the separator chamber 12. This may be done by scooping components from the first part, for example after removing the top 70 of the separator chamber 12. Alternatively, the buoyant components 18 may be absorbed in specially designed surface absorption pads, or by use of filter papers stretched across the chamber, below the level of the height $H_{lc}$ of the lift conduit 56. Additionally, the filter medium 112 and/or the porous support 110 may be cleaned and/or replaced periodically. After removal of the buoyant components, they may be discarded.

Referring now to FIGS. 1 and 3, the diameter of the discharge conduit 48 may be larger than the diameter of the return tube 66 or outlet 29. Additionally, it will be appreciated that in some embodiments only a fraction of the liquid 16 may flow through the separator chamber 12 with the buoyant components 18 and the gas bubbles 42, as the majority of the liquid will pass directly in and out of the receiving chamber. In some embodiments, the discharge conduit 48 and the inlet 38 may be substantially the same diameter. The diameter of the lift conduit 56 may be determined by the desired rise in the gas bubbles 42 with the buoyant components 18.

The flow into the discharge conduit 48 at the bottom of the receiving chamber 36 is substantially free of buoyant components 18. It is to be appreciated that the liquid 16 exiting through the discharge conduit 48 may still contain some buoyant components 18. It is also to be appreciated that certain non-buoyant contaminants may be discharged through the discharge conduit 48. Additional traps designed to capture such materials may be provided; however, the non-buoyant discharge does not form an objectionable surface "slick". Also, it is to be appreciated that saturated pollutants which become non-buoyant after rising to the separator chamber 12 may remain trapped in the first part 20 of the separator chamber 12 or even at the bottom of the receiving chamber or on the perforated layer until they are drained and/or cleaned.

It will be appreciated that other embodiments of the invention may include secondary filters in the return tube 66 or in the discharge conduit 48 to assist in removing both non-buoyant and additional buoyant components from the liquid 16.

The component separator 10 of the invention may be used in conjunction with disposable filter systems. In this embodiment, the component separator 10 may be a primary treatment, thereby reducing the rate that the filters need to be replaced. It is to be appreciated that there should be sufficient gravity for liquid to flow through the filters; otherwise a pump may need to be added to the system. Generally, the overall pressure drop across the device is intended to be low enough to operate without external pumps.

During operation, liquid mixture 14 enters the component separator 10 into receiving chamber 36 through the inlet 38. The perforated layer 46 diffuses local high velocity flows which may, otherwise, carry buoyant components downward and allows the liquid 16 to flow through the perforated layer 46 into the bottom of the receiving chamber 36, substantially free of buoyant components 18, and the liquid 16 exits through the discharge outlet 48. The entrapped gas bubbles 42, the buoyant components 18, and some liquid 16 flow to the top of the liquid mixture 14 and up through the lift conduit 56 and into the first part 20 of the separator chamber 36. The gas 42 may exit through the gas vent 58, while the buoyant components 18 rise to the top of the fluid mixture 14. The denser fluid 16 settles below the buoyant components 18 and flows underneath or through the wall 24 into the second part 22 of the separator chamber 12.

In the embodiment of FIGS. 1-2, when the level of the liquid in the separator chamber 12 rises above the return tube 66 substantially free of buoyant and sinking components, then the liquid 16 in the second part 22 of the separator chamber 12 exits through the return tube 66 back into the receiving chamber 36 where the liquid 16 may move through the perforated layer 46 and exit through the discharge outlet 48. Alternatively, the liquid may recirculate through the system.

In the embodiment of FIG. 3, the liquid drains substantially free of buoyant and other (filtered) components through the filter medium 112 and porous support 110. The liquid then drains from the outlet 29 and back into the receiving chamber 36. The outlet 29 drains the liquid to keep the level of liquid mixture in the separator chamber from getting too high and possibly flowing back down the lift conduit 56. Once in the receiving chamber 36, the liquid may move through the perforated layer 46 and exit through the discharge outlet 48 or the liquid may recirculate through the system.

Referring to the embodiment of FIGS. 1 and 2, it will be appreciated that when the liquid mixture 14 enters the separator chamber 12 for the first time, the gap 30 below the wall 24 or communication passage is not sealed by liquid 16, and therefore, some buoyant components 18 may flow with liquid 16 into the second part 22 of the separator chamber 12. However, once the wall 24 is sealed by the liquid level in the separator chamber 12 the liquid does not need to be drained completely from the separator chamber 12 such that the wall 24 stays sealed and substantially all of the buoyant components 18 stay in the first part 20 of the separator chamber 12, even when flow into the component separator 10 is stopped and started again. Alternatively, the communication passage may be selectively openable and closable, instead of continuously open so that the communication passage may be opened once the liquid level reaches a height to seal the communication passage.

Figure 4:
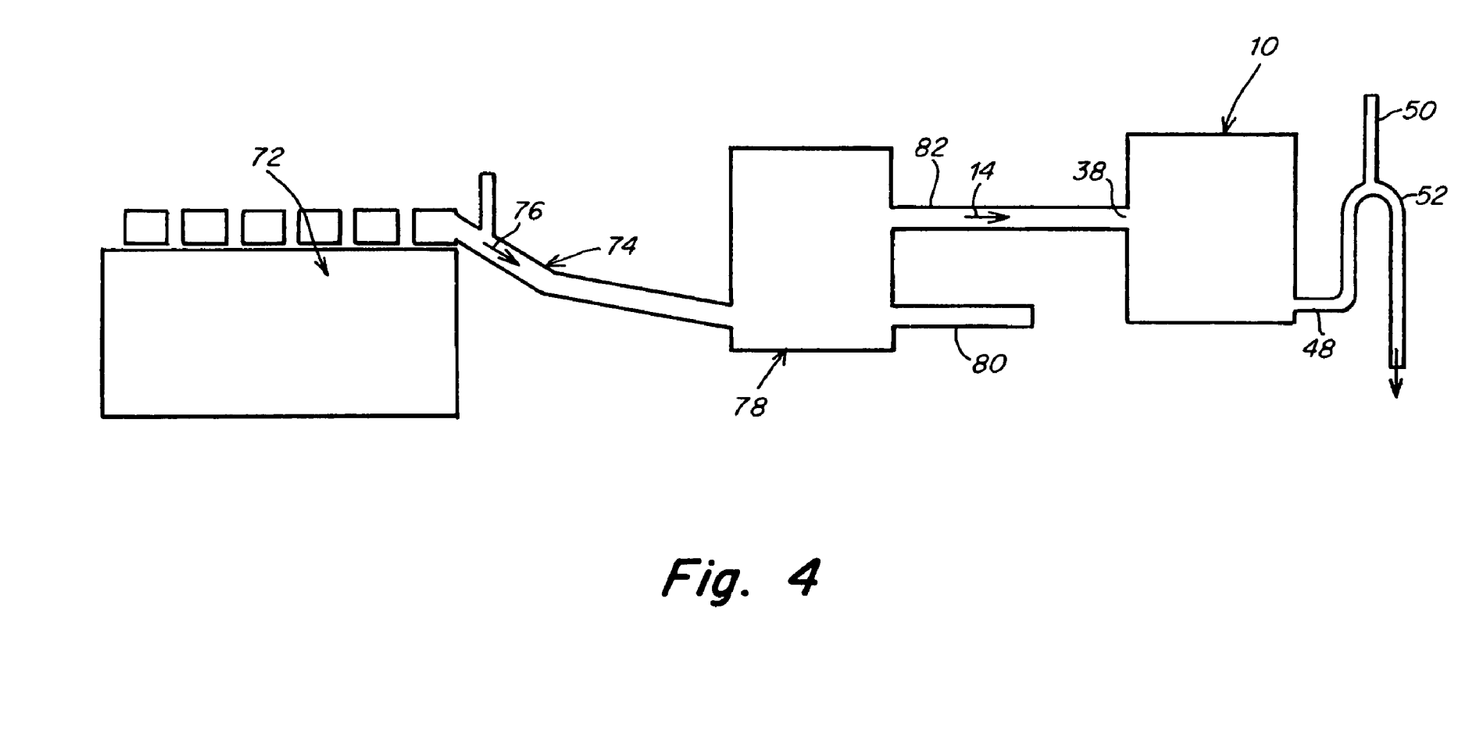
FIG. 4 is a schematic view of a marine engine exhaust system according to the invention.

Referring now to FIG. 4, the component separator 10 is illustrated in combination with a power generator 72 and exhaust system 74. It is to be appreciated that this is for illustrative purposes only and numerous different configurations using the component separator 10 may be employed. The power generator 72 may be any kind of device that generates power, for example an internal combustion engine that uses diesel or gasoline fuel. The generator 72 produces an exhaust gas and a liquid coolant is used to cool the exhaust gas. Any suitable liquid may be used as the coolant. However, it is to be appreciated that if the power generator 72 is a marine engine for powering a marine vessel, then water is in abundant supply outside the marine vessel and may be used as the liquid coolant. The liquid coolant is injected into the exhaust gas forming a fluid mixture 76. The fluid mixture 76 exits the power generator 72 and is directed to the water separating silencer 78. The silencer 78 may be any kind of device or combination of devices that separates the fluid mixture 76 substantially into its exhaust gas and liquid coolant components. As the exhaust gas is separated from the fluid mixture, it may be substantially free of non-gaseous components, such as soot and unburned fuel, that were contained in the gas before exiting the engine. As is known in the art, the "dried" exhaust gas may exit from the hull of the marine vessel through a dry gas discharge conduit 80. The liquid mixture 14 from the silencer, including at least liquid 16 and buoyant components 18 and some entrapped gas 42, is then directed to the component separator 10 of the present invention via conduit. The component separator 10 substantially separates the buoyant components 18 and non-buoyant components from the liquid 16 as described in any of the embodiments. The liquid 16 is then released from the hull of the marine vessel and back into the surrounding water through the liquid discharge conduit. The trapped buoyant components 18 may be cleaned from the component separator as desired.

Figure 5:
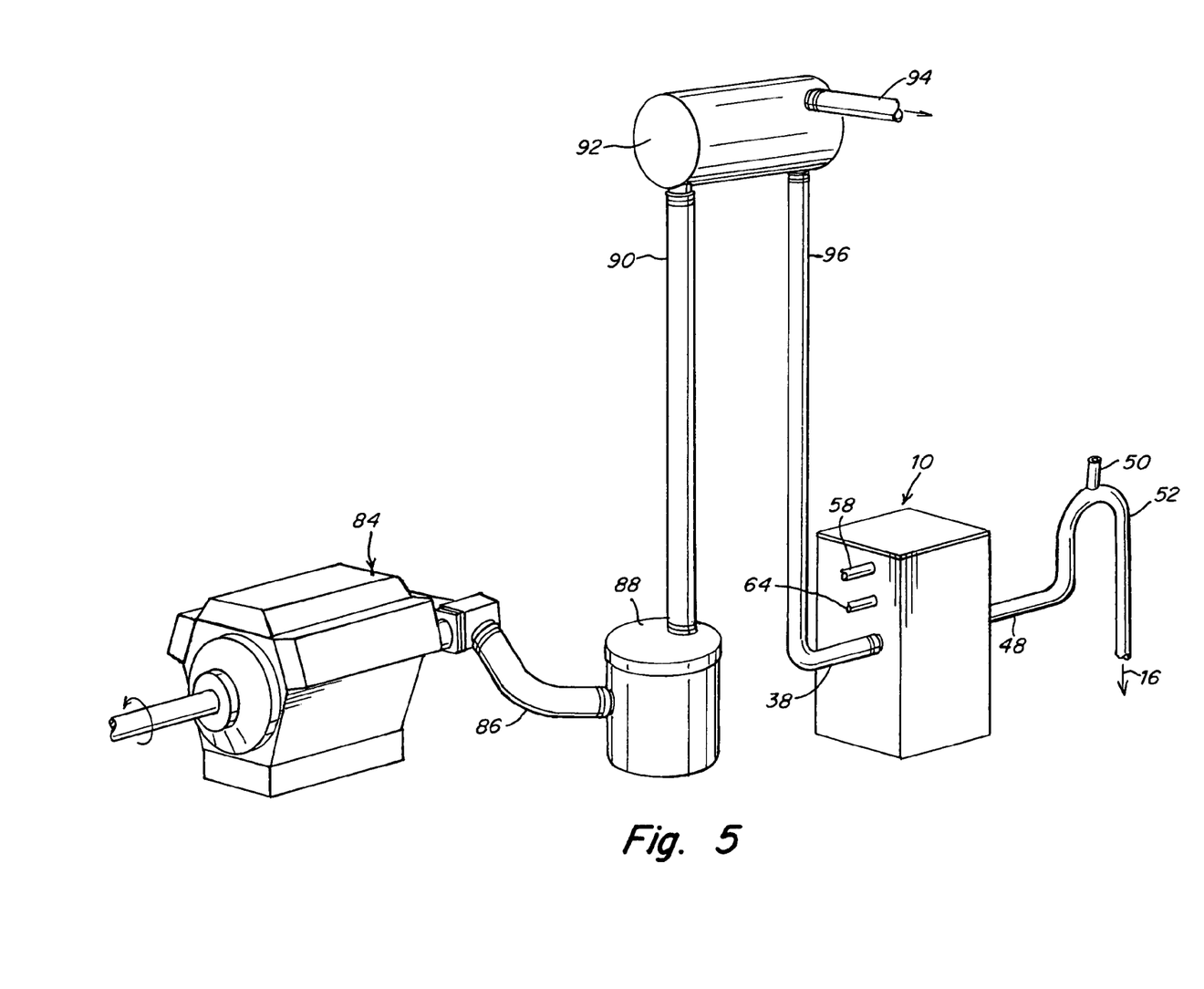
FIG. 5 is a perspective view of the marine engine exhaust system of FIG. 4.

FIG. 5 illustrates a particular embodiment of the component separator 10 in combination with a diesel marine engine 84. The diesel engine 84 generates power, and liquid coolant is combined with the exhaust gas to form a fluid mixture to cool the exhaust gas. The fluid mixture, including exhaust gas and liquid coolant, is expelled through a tube 86 to a water lift silencer 88. Then the fluid mixture is lifted through a tube 90 to a liquid separating silencer 92, where the exhaust gas exits through an exhaust gas discharge tube 94 and the liquid mixture, which may include liquid, buoyant components and entrapped gas, exits through a second tube 96 to the component separator 10 of the present invention. The component separator 10 substantially separates the liquid and the buoyant components from one another as described in any of the embodiments and the liquid is discharged through the liquid discharge conduit.

Figure 6:
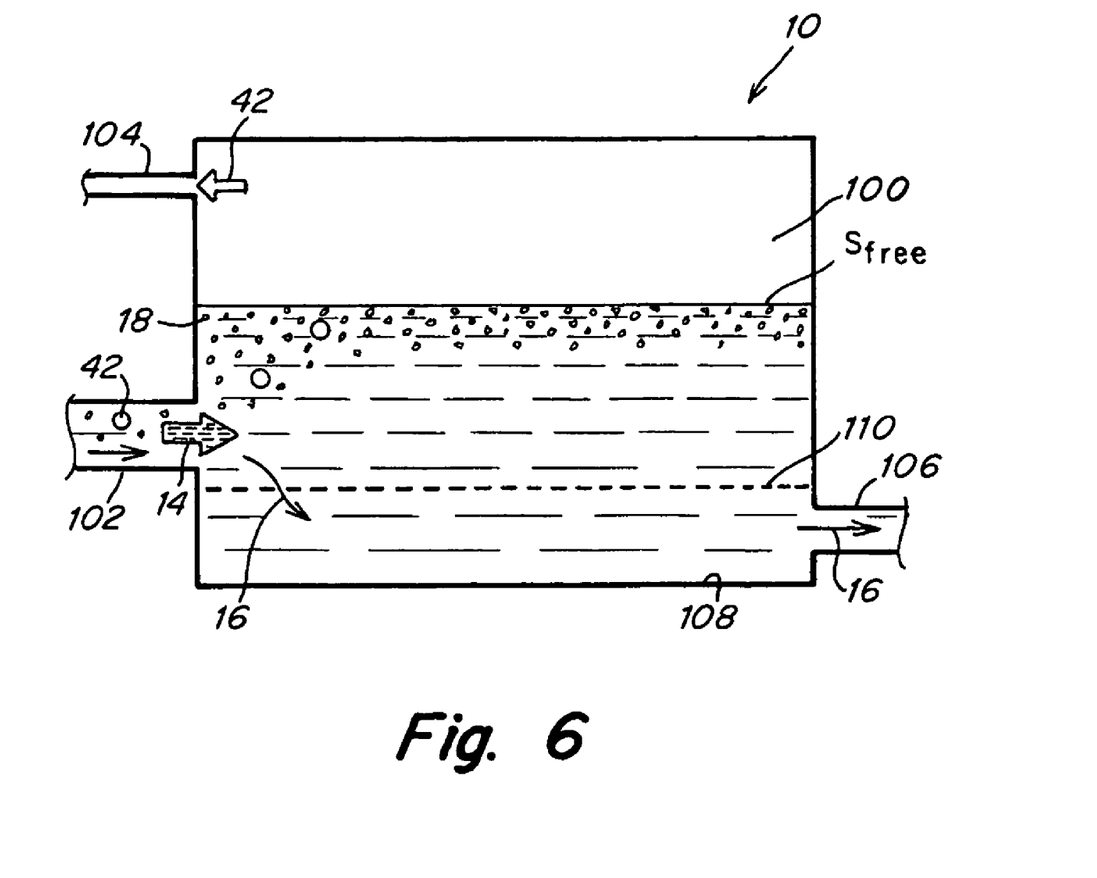
FIG. 6 is a schematic view of another embodiment of a buoyant component separator according to the invention.

In another embodiment of the invention shown in FIG. 6, the component separator 10 may include a single chamber 100 into which a liquid mixture 14 is introduced having both liquid 16 and buoyant components 18. The liquid mixture 14 may be introduced though an inlet 102, the liquid mixture may include liquid 16, buoyant components 18 and entrapped exhaust gas 42 as described above. The inlet may be provided at any suitable location, for example in the middle or lower portion of the chamber. Alternatively, the inlet may be provided through the bottom of the chamber by a conduit similar to the lift conduit 56 described above. The buoyant components 18 may be allowed to separate from the liquid 16 by floating adjacent the free surface $S_{free}$. A vent 104 may be provided above the free surface $S_{free}$ of the liquid to allow the exhaust gas 42 to escape. An outlet 106 may be provided adjacent a bottom 108 of the chamber 100, such that the liquid 16 may exit substantially separated from the buoyant components 18 while the buoyant components accumulate adjacent the free surface $S_{free}$. The liquid 16 may flow from the chamber 100 with or without assistance. For example if suitable, a pump may assist the flow or a loop with a vent, as shown in the previous embodiments may be provided with the outlet. Optionally, a perforated layer 110 may be provided to interfere with the potential high velocity flows that may occur at the inlet 102 that may force buoyant components downward and interfere with their separation from the liquid. The buoyant components 18 may be periodically removed from the free surface $S_{free}$ of the liquid 16 or may be captured, for example by a filter, paper or other device. Otherwise, the buoyant particles may be allowed to saturate, sink, and be expelled from the hull to sink below the water surface.

It will be appreciated that more than one inlet 38 may direct flow of liquid mixture 14 into either the receiving chamber 36 or the separator chamber 12 and 100 of the component separator 10 of the invention. For example, multiple engines may share a common component separator 10 and their respective fluid mixtures may be combined before entering the component separator 10 or they may be directed separately into the component separator 10.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of separating buoyant components from a mixture of engine exhaust gases and liquid, the method comprising:

flowing a first mixture of engine exhaust gases and liquid to a receiving chamber;

directing more buoyant components of the first mixture along a slanted upper surface of the receiving chamber and toward a lift conduit;

flowing exhaust gases of the first mixture through the lift conduit of the receiving chamber and toward a gas containing portion of a separator chamber, thereby propelling buoyant liquid and solid components of the first mixture through the lift conduit;

flowing the buoyant liquid and solid components of the first mixture out of the lift conduit and downward, toward a free liquid surface of a second mixture that resides in a first part of the separator chamber;

separating less buoyant components of the second mixture from more buoyant components of the second mixture; and moving the less buoyant components of the second mixture from the first part of the separator chamber to a second part of the separator chamber.

2. The method of claim 1, wherein moving the less buoyant components of the second mixture from the first part of the separator chamber to a second part of the separator chamber comprises flowing the less buoyant components of the second mixture under a wall that divides the first part of the separator chamber from the second part of the separator chamber.

3. The method of claim further comprising:

returning a portion of the less buoyant components to the receiving chamber from the second portion of the separator chamber.

4. The method of claim 3, wherein the filter medium lies beneath the free surface.

5. The method of claim 3, wherein returning comprises flowing the portion of the less buoyant components through a return tube that extends to the free surface of the second mixture.

6. The method of claim 5, wherein the filter medium is supported by a porous support.

7. The method of claim 3, further comprising:

removing the liquid from the receiving chamber after exhaust gases and buoyant components have been separated therefrom.

8. The method of claim 7, wherein removing the liquid comprises flowing the liquid through a discharge opening positioned in a lower portion of the receiving chamber.

9. The method of claim 8, further comprising:

passing the liquid through a perforated layer in the receiving chamber prior to flowing the fluid through the discharge opening.

10. The method of claim 1, wherein moving the less buoyant components of the second mixture from the first part of the separator chamber to a second part of the separator chamber comprises flowing the less buoyant components of the second mixture through a filter medium that divides the second part of the separator chamber from the first part of the separator chamber.

11. The method of claim 1, wherein flowing the first mixture of engine exhaust gases and liquid to the receiving chamber comprises imparting a circular motion to the first mixture as the first mixture enters the receiving chamber.

12. The method of claim 1, further comprising:
reducing velocity of the first mixture as the first mixture enters the receiving chamber.

13. The method of claim 1, further comprising:
releasing liquid portions of the more buoyant components of the second mixture from the first part of the separator.

14. The method of claim 13, wherein releasing the liquid portions of the more buoyant components comprises flowing the liquid portions through an opening that lies below the free surface of the second mixture.

15. The method of claim 1, further comprising:
scooping solid portions of the more buoyant components of the second mixture from the first part of the separator.

16. The method of claim 1, further comprising:
providing an internal combustion engine and exhaust system in combination with the separator chamber, the first mixture flowing from the exhaust system and into the receiving chamber.

17. The method of claim 1, wherein the buoyant components include non-fluid components.

18. The method of claim 17, wherein the non-fluid components include soot.

19. The method of claim 1, wherein the buoyant components include fluid components.

20. The method of claim 19, wherein the fluid components include fuel.

21. The method of claim 1, further comprising:
flowing the exhaust gases out of the separator after the exhaust gases pass through the lift conduit.

* * * * *